United States Patent [19]

Dove

[11] Patent Number: 4,517,055
[45] Date of Patent: May 14, 1985

[54] SLICE LIP CONTROL

[76] Inventor: Norman F. Dove, 1493 Crown St., North Vancouver, British Columbia, Canada, V7J 1G4

[21] Appl. No.: 501,530

[22] Filed: Jun. 6, 1983

[51] Int. Cl.³ .............................................. D21F 1/06
[52] U.S. Cl. .................................... 162/344; 74/470; 116/272; 116/281; 162/262; 162/263; 162/347; 403/328; 403/338
[58] Field of Search ............................. 162/344–347, 162/259, 262, 263; 74/470; 403/335, 336, 338, 328, 361, 373; 116/272, DIG. 7, DIG. 21, 281; 73/316; 340/686, 626, 690

[56] References Cited

U.S. PATENT DOCUMENTS

| | | | |
|---|---|---|---|
| 2,079,460 | 5/1937 | Marty | 403/336 |
| 2,618,155 | 11/1952 | Conner et al. | 73/316 |
| 2,688,884 | 9/1954 | Warmoes et al. | 74/470 |
| 2,851,799 | 9/1958 | Meents et al. | 340/690 |
| 2,949,324 | 8/1960 | Birge et al. | 403/336 |
| 3,628,589 | 12/1968 | Means et al. | 162/347 |
| 3,976,539 | 8/1976 | Kirjavainen | 162/344 |
| 3,994,773 | 11/1976 | Wolf et al. | 162/347 |
| 4,042,305 | 8/1977 | Vincent | 403/328 |
| 4,342,619 | 8/1982 | Gladh | 162/347 |
| 4,406,740 | 9/1983 | Brieu | 162/259 |

FOREIGN PATENT DOCUMENTS 95500  3/1968  France ............................... 162/347

OTHER PUBLICATIONS

Carlstedt et al., "Development and Design of KMW Headbox for Fourdriniers-II", *Paper Trade Journal*, Sep. 11, 1972, pp. 44-49.

Primary Examiner—S. Leon Bashore
Assistant Examiner—K. M. Hastings
Attorney, Agent, or Firm—Spensley, Horn, Jubas & Lubitz

[57] ABSTRACT

A coupling to attach the lip of a head box on a paper making machine to the head box, the coupling comprises a body to be attached to an adjuster extending from an actuator. The body is attached to the head box to permit movement of the body relative to the head box, under the influence of the actuator. The body has a recess adapted to receive the lip. There is a second recess, generally perpendicular to the lip-receiving recess.

The lip received in the first recess is pivotally clamped against the head box.

26 Claims, 8 Drawing Figures

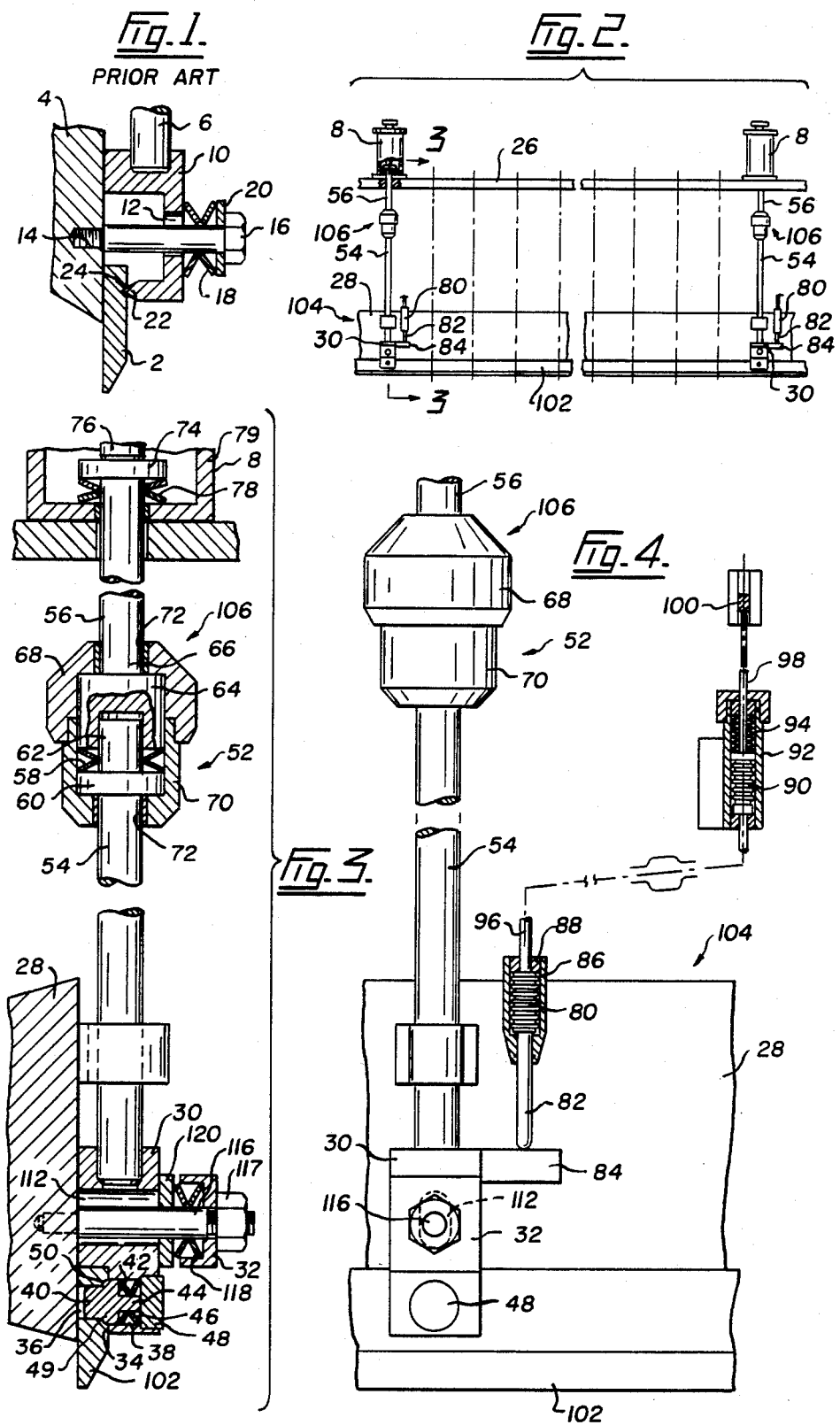

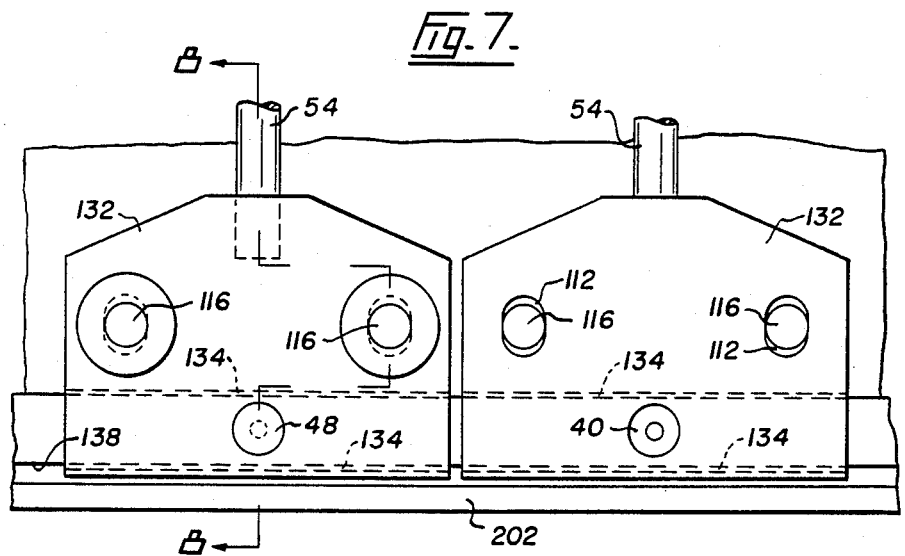
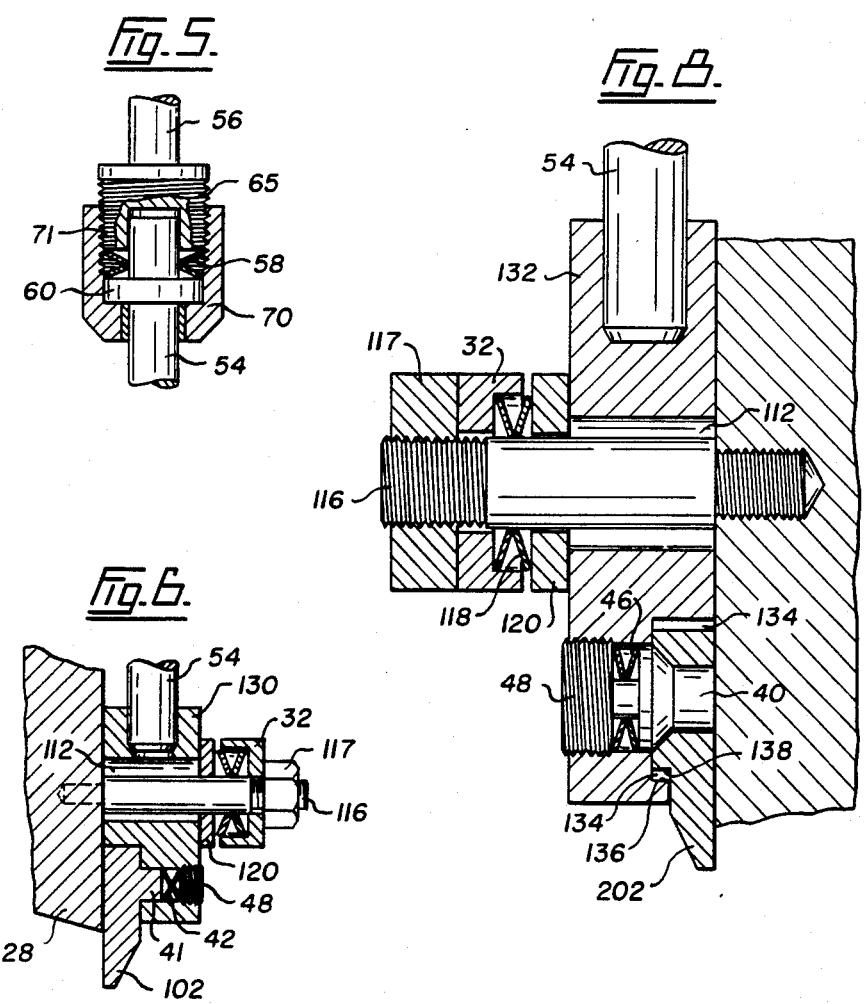

SLICE LIP CONTROL

FIELD OF THE INVENTION

This invention relates to a coupling to attach the lip of a head box on a papermaking machine to the head box, to a force limiter useful with such a coupling and to a position transmitter useful to determine the position of the lip.

DESCRIPTION OF THE PRIOR ART

In a modern papermaking machine it is important to establish uniformity of moisture content and basis weight in the cross machine direction. Paper machine efficiency, fibre use, paper quality, roll quality and convertibility are all substantially reduced if uniformity of moisture and basis weight is not achieved.

As to paper machine efficiency if a certain part of a slice opening is bigger than other parts of the opening then the larger open area supplies a larger volume of fibre suspension to the wire than the adjacent areas. This results in a streak of higher dry basis weight in the machine direction and more water to drain and dry.

Paper machines are driven by section and the paper is tensioned on the machine by driving a subsequent section faster than a preceding section. Paper breaks in between sections are caused by the paper web being stretched beyond the breaking point by the speed difference between the sections. The tension distribution results from the stress strain relationship of the sheet and the stress strain characteristics of a paper web are very strongly dependent upon the moisture content of the sheet. Increased moisture permits higher stretch but reduces the tensile strength.

It therefore follows that a paper web with streaks of high and low moisture will be transported through the machine with uneven tension. Dry streaks take up the load required for the sheet transport. As the dry paper also has lower stretch capacity this will mean that the speed difference between sections will have to be adjusted within a smaller range so as not to exceed the stretch capacity of the paper in the dry areas. Uneven tension will however also cause a tendency to wrinkling of the web which can cause folds and paper breaks. To avoid wrinkling the sheet has to be stretched between sections. The result of this is that the operator is left with very narrow limits of control and process disturbances will easily cause a paper break.

In modern machines the increased paper machine speed, generally lower basis weight and increased use of short fibres, which give lower stretch, have increased the requirements for cross direction uniformity and basis weight moisture.

Paper quality is directly dependent on uniformity of basis weight and moisture. Lack of uniformity in these parameters display themselves most clearly in coating, calendering and super calendering.

By reducing variations in the cross machine basis weight the average sheet basis weight can be lowered but specifications still met. This is desirable because of the fibre savings. Non-uniform moisture content gives uneven coating colour pickup and also uneven drying of the coating. The migration of the binder of the coating layer into the sheet is also influenced by the moisture content of the sheet. The result is a coating layer of varying thickness and with varying surface strength and ink receptivity.

Uneven moisture content will also cause a variation in sheet temperature in the later part of the dryer section. The dry parts of the web will have a higher temperature than the wet part and this causes localized heating of the calender rolls with subsequent change in calender roll diameters. This in turn gives non-uniform calendering pressure.

The undesirable effects of sheet quality resulting from super calendering a sheet of non-uniform moisture is that the wetter parts of the sheet have a much higher degree of plasticity and will respond more strongly to the super calendering action with consequent variations in the surface structure of the sheet.

Roll quality and convertibility are strongly influenced by variations in basis weight moisture. Varying basis weight and varying calender action provides caliper variations in the sheet which would cause non-uniform hardness and non-uniform sheet tension in the rolls. The streaks of lower basis weight, which are dried before the rest of the web, are elongated and can cause wrinkling during reeling, winding and converting. Non-uniform moisture in the sheet gives runnability problems and breaks during conversion.

It is therefore clearly important that the slice lip on the head box of a modern paper machine be provided with extremely fine control either to establish complete uniformity of the slice opening or to provide sensitive correction if conditions downstream of the lip want correction.

In early paper machines the tender would usually adjust the slice screws to control the thickness of the jet from the head box. The back tender would blow cold air or place friction pads in certain areas of the calender to engender local changes in the calender roll temperature and diameter and thus improve the uniformity of the hardness of the reel.

The modern approach is to use automated profile control equipment. One such piece of equipment scans the reel hardness. There is a feedback from the reel hardness scanner to a calender blowing system. Another system uses automatic cross machine moisture control with feedback from a scanning moisture meter to apply steam to differing parts of the sheet. Another more fundamental approach is a feedback to the control of the slice screws from the bone dry basis weight profile.

Control of the slice opening profile from the oven dried basis weight profile can be made manually or automatically. However for both cases exact knowledge of actual slice opening profiles is required.

An important requirement of the slice opening profile is that the profile must be able to be changed smoothly and continuously over small areas. Another important requirement is that the deformible upper slice lip be protected from the application of forces large enough to cause permanent deformation to the lip. It is also clearly desirable that change of slice lip opening be easy and fast to carry out.

It will, of course, be realized that control of the lip profile cannot be carried out if the existing profile cannot be determined. Traditionally the position of the lip was assessed by micro meter indicators in the screws that control the movement of the slice lip. However considerable problems were encountered with backlash and the position had to be read off the screw at the location. The current technology is to use LVDT transmitters that will directly convert a linear movement into a change in an electrical signal and, from the signal, give the position of the slice lip. Normally one position transmitter is used for every slice adjustment and typically the slice adjustments are at 6 inch centres across the lip. However a major disadvantage of the system is that the electronic equipment must be placed in the vicinity of the slice and that vicinity provides extremely adverse conditions for electrical equipment, being humid, hot and wet with liquid water.

The system by which the deformable upper slice lip is held to the head box—normally to a slice body formed on the head box—is of prime importance. In the most widely used present system the lip of each slice is pressed against the front wall of a head box at each slice screw jack position by clamps. The clamps are spring loaded and fit into wedge shaped recesses in the lip. The clamps are typically about one and a half inches wide. To achieve movement of one position of the lip by means of an adjusting device, for example, a screw jack, a force is applied to the clamp and the clamp transmits the force to the lip. A disadvantage with this design is that the tip of the clamp can slide within the wedge shaped recess. Thus the movement of the clamp will not necessarily correspond to the actual movement of the lip.

A further disadvantage of this system stems from the requirement that there be a smooth continuous change of lip profile. With the clamp having a width of up to one and a half inches this is clearly not possible. The lip is held in a fixed position for the width of the clamp and no flexing is allowed except between clamps. This clearly puts considerable restrictions on the control of a slice profile and thus on the basis weight profile. These restrictions can be severe in cases where the sheet is set very fast and very little evening effect is experienced during sheet formation. This is the case with twin wire formers where the sheet is set almost immediately after delivery.

It will be appreciated that the slice lip must be protected from too large deformation over a short length of the lip or permanent deformation of the lip will result. It has been customary to use a shear pin in the screw jack assembly. As initial friction forces, which have to be overcome to initiate movement of the slice lip, can be larger than those required to cause a permanent deformation the method is not a satisfactory protection of the lip. A further method of protecting the lip has been to provide a clamping arrangement, as discussed above, which slips away from the lip if a predetermined force is exceeded. However this type of arrangement presents two problems. As the connection is not positive there is no direct correlation between the movement of the slice lip clamp and the slice lip. Thus movement of the clamp does not result in a predictable movement of the lip. Further the initial friction forces as discussed above, are such that it is not practical to restrict the force that can be applied by the slice lip clamp to a level that would protect the lip. It will be appreciated that it is necessary to prevent damage to the lip as in the event of lip damage the entire paper machine must be shut down to replace the lip. That is there is lost production as well as damage to expensive equipment.

SUMMARY OF THE INVENTION

The present invention provides apparatus able to overcome all the above disadvantages.

Accordingly, in a first aspect the present invention is in a coupling to attach the lip of a head box on a paper making machine to the head box, the coupling comprising a body adapted to be attached to an adjuster extending from an actuator, means attaching the body to the head box to permit movement of the body relative to the head box, under the influence of the actuator, and is the improvement whereby the body has a first recess adapted to receive the lip; a second recess, generally perpendicular to the first recess; means extending through the second recess to engage a lip received in the first recess to clamp the lip against the head box.

In a further aspect the invention is a force limiter to limit the force applied by an actuator, through an adjuster, to the lip of a head box on a paper machine, the adjuster comprising first and second coaxial rods, the limiter comprising; a flange formed adjacent to the end of the first rod, the first rod projecting beyond the flange; a housing formed on the second rod, to receive at least part of the first rod that extends beyond the flange; a spring between the flange and the housing to transmit forces between the flange and the housing and thus the first and second rods.

In yet a further aspect the present invention is a position transmitter able to signal the position of a lip on a head box of a paper making machine, the paper transmitter comprising a first flexible vessel to contain a substantially incompressible fluid; a sensor communicating with the first flexible vessel and with the lip; a second flexible vessel; means tending to compress the second flexible vessel; a conduit communicating the first and second flexible vessels whereby movement of the lip moves the sensor to expand or contract the first flexible vessel to move the incompressible fluid through the conduit to expand or contract the second flexible vessel; and means to sense the movement of the second vessel.

In particular the present invention provides a system of attaching the lip of a head box on a paper making machine that incorporates all the above aspects of the invention.

BRIEF DESCRIPTION OF THE DRAWINGS

Aspects of the invention, and of the prior art, are illustrated in the accompanying drawings in which:

FIG. 1 illustrates a prior art method of attaching a lip to a head box;

FIG. 2 is a schematic view illustrating the present invention;

FIG. 3 is a view on the line 3—3 in FIG. 2, illustrating several aspects of the present invention;

FIG. 4 illustrates the position transmitter aspect of the present invention;

FIG. 5 illustrates a detail of a further embodiment of the invention;

FIG. 6 illustrates a variation of the invention.

FIG. 7 illustrates a detail of a further embodiment of the invention; and

FIG. 8 is a view on the line 8—8 in FIG. 7.

DESCRIPTION OF THE PREFERRED EMBODIMENTS

FIG. 1 illustrates a widely used piece of prior art for locating the lip 2 of a head box 4 of a paper making machine. There is an adjuster 6 extending downwardly from an actuator 8, not shown in FIG. 1 but as illustrated for example in FIG. 2, attached to a clamp 10 formed with a recess 12. The head box 4 has a threaded opening 14 to receive a bolt 16. A spring 18 is clamped between a washer 20, under the head of the bolt 16, and the clamp 10. It will be noted that recess 12 is considerably larger than the diameter of the bolt 16 so that movement of the clamp 10 relative to the bolt 16 is possible. At its lower end the clamp 10 is provided with an edge 22 to engage in a recess 24 in the lip 2.

The disadvantages of this prior art arrangement are discussed generally in the preceding part of the specification. In particular it should be noted that the recess 24 is of a relatively large length, preventing a smooth variation in the profile of the lip 2 and that the edge 22 of the clamp 10 can be moved out of the recess 24.

The present invention is illustrated in FIGS. 2 to 4. FIG. 2 shows generally the location of actuators 8, which may be of any type known in the prior art, on a surface 26 above lip 102 located on slice body 28 of head box 104. Lip 102 is attached to the head box slice body 28 using a coupling comprising a body 30 adapted to be attached to adjuster 106 extending from actuator 8. There is a stud 116 extending through the body 30 using an opening 112 sufficiently large to permit movement of the body 30 relative to the bolt 116. Nut 117 is threaded on stud 116. As in the prior art the pressure is applied using a washer 120. A housing 32 is also used for spring 118 which is a means of applying the pressure to the body 30. The body 30 has a first recess 34 that is shaped to receive the lip 102. The lip 102 is formed with a plurality of circular openings 36 (see FIG. 3). Each opening 36 is aligned with a second recess 38 in the body 30, generally perpendicular to the first recess 34 in the body 30.

There is a probe 40 to engage a circular opening 36 in the lip 102. The probe is formed with a first shoulder 42 and a spindle 44 extends from the shoulder 42 to locate a spring 46. There is a plug 48 threadedly received by an internal thread in the second recess 38. The arrangement is such that by turning the plug 48 pressure is applied to the spring 46, located on spindle 44, to force the probe 40 tighter within the opening 36 in the lip 102. To facilitate location the opening is provided with a chamfered entrance 49 and there is a second shoulder 50, also chamfered, on probe 40 to abut the entrance 49 of the opening 36.

Adjuster 106 extends towards actuator 8 the arrangement being such that the adjuster 106 transmits the movement of the actuator 8 to the body 30, and thus the lip 102. In a desirable aspect of the invention the adjuster 106 includes a force limiter shown generally as 52. The adjuster 106 is formed in two parts, a first, lower part 54 communicating with the body 30 and a second, upper part 56 communicating with the actuator 8. The force limiter 52 comprises a spring 58 arranged between the first and second parts 54 and 56. To facilitate operation of the spring 58 the first part 54 of the adjuster 106 is formed with a flange 60 adjacent one end 62 and the second part 56 has a housing 64 at end 66 to receive that part 62 of the lower part 54 of the adjuster 106 above the flange 60. The two adjacent ends 62 and 66 of the first and second parts 54 and 56, the flange 60 and the housing 64 are received within a casing formed of upper part 68 threadedly engaged by lower part 70. The casing also serves to locate and assist in maintaining alignment of the first and second parts 54 and 56 of the adjuster 106. There are openings 72 in the casing so that the adjuster parts 54 and 56 may pass through. Desirably the openings are provided with bushes.

At its top the second or upper part of the adjuster 56 has a flange 74, which is contacted by the downwardly movable arm 76 of the actuator 8 shown merely partially in FIG. 3. A spring 78 is positioned beneath the flange and inside the casing 79 of the actuator 8. The structure of the actuator 8 will not be expanded on. It may, for example, be a simple piston and cylinder arrangement operated hydraulically or pneumatically and could, for example, even be a manually operable device.

Springs 58 and 78 thus act to limit the force applied to the lip by the actuator. By choosing the appropriate spring rate it can be assured that the force reaching the lip is never enough to distort the lip. It will be noted that spring 58 restricts the downward force applied and spring 78 restricts the upward force applied.

The invention includes a position transmitter to signal the position of the lip 102. The position transmitter comprises a first flexible vessel 80 to contain a substantially incompressible fluid, for example a hydraulic oil. There is a sensor 82 communicating with the first flexible vessel 80 and extending downwardly to contact a flange 84 extending from the body 30. The first flexible vessel 80 is located within a housing 86 that is plugged at 88. There is a second flexible vessel 90, remote from the first, located within a housing 92. Spring 94, also located in the housing 92, acts to tend to compress the second flexible vessel 90. There is a conduit 96 communicating the first and second flexible vessels 80 and 90. The arrangement is such that movement of the lip 102 moves the sensor 82 to expand or contract the first flexible vessel 80. Such movement moves the incompressible fluid through the conduit 96 to expand or contract the second flexible vessel 90.

The second flexible vessel 90 has an arm 98 extending upwardly to a linear voltage displacement transmitter shown schematically at 100. Such devices are known in the art and will not be further described here.

In the variation of FIG. 5 the casing made up of upper part 68 and lower part 70 as shown in FIG. 3 is replaced by forming the exterior of housing 64 with a thread at 65 to receive an internal thread 71 on lower part 70.

In the variation of FIG. 6 the lip 102 is formed with a lug 41 to abut spring 42 tensioned by plug 48. The same pivotal positive location is provided as with the FIG. 3 embodiment.

FIGS. 7 and 8 show a system substantially the same as that shown in FIG. 3 with two major exceptions. First the body 132 is of considerable width, unlike body 32, and there is clearance 134 at the top and bottom of the lip 202 in recess 134. Secondly there is a shoulder 136 arranged at the bottom of recess 134. A shoulder 138 is formed on the lip. Two studs 116 are used for body 132. Otherwise the structure is substantially as shown in FIGS. 2 to 4.

In operation the illustrated apparatus is used to sense the position of the lip 102 at approximately six inch centres. Analysis of the paper sheet is carried out downstream and, if necessary, movement of the lip 102 is carried out by operating the necessary actuators 8. The actuator 8 transmits force through the adjuster 106, the force supplied is limited by the limiter 52 to avoid the application of excessive force to the lip 102. The lower part 54 of the adjuster moves the body 30 and thus the lip 102 through the probe 40. It should be noted that because the probe 40 is circular the lip 102 can pivot about each plug so that a smooth profile and, in particular, a smooth change of profile is achieved.

The advantages of the invention are many. As indicated profile of the lip can be varied smoothly and easily and without the risk of distortion of the lip. The lip is also positively located on the probe 40. Because of the presence of the force limiter 52 there is no necessity to use shear pins or to have the clamps move out of engagement with the lip when the force exceeds a certain level. Sensing of the position of the lip is free of the problems of backlash. The system illustrated, using flexible vessels, gives an extremely precise reading. The sensing equipment also has the advantage that the second flexible vessel and the associated electrical equipment is well clear of the paper making environment. It should also be noted that the body makes it extremely easy to change the slice lip. The plugs 48 are retracted so that they do not engage with the openings 36 in the lip 102, the lip is removed, a new lip placed in position and the plugs 48 then screwed in.

Using the present invention the lip is protected. With the FIGS. 7 and 8 embodiment it is possible to ensure the lip cannot be deflected to a point that will exceed a bend limit. When the lip bends it eventually touches the ends of the body 132. Thus the part of the lip between bodies 132 goes in essence into shear. That is there is some twist or bend of the lip but the main loading is shear. The applied force is thus limited in a way that ensures a positive drive right up to the predetermined force level. This allows bending of the lip within bend limits but before a limit is reached the lip coupling places the lip in shear with a corresponding rapid increase in force for any given movement of the slice lip spindle. This increase in force will cause the force limiter to become effective to avoid distortion of the lip.

I claim:

1. In a paper making machine having a slice lip to control the feed from a head box to a wire on which the paper is formed;
   a coupling to attach the lip of the head box to the head box, the coupling comprising a body adapted to be attached to an adjuster extending from an actuator, means attaching the body to the head box to permit movement of the body relative to the head box, under the influence of the actuator, the improvement whereby the body has a first recess adapted to receive the lip;
   means defining a second recess, generally perpendicular to the first recess;
   means located in the second recess to engage the lip received in the first recess to pivotally clamp the lip against the head box.

2. A coupling as claimed in claim 1 in which the lip is formed with a plurality of circular openings, each opening aligns with a second recess and in which the means located in the second recess comprises a probe to engage a circular opening in the lip.

3. A coupling as claimed in claim 2 in which the probe is formed with a first shoulder to receive a spring;
   a spring to abut the first shoulder;
   a plug to apply pressure to the probe through the spring.

4. A coupling as claimed in claim 3 in which the second recess is formed with an internal thread and the plug is formed with an external thread to engage the internal thread whereby rotation of the plug reciprocates the plug on the thread to vary the pressure applied to the probe through the spring.

5. A coupling as claimed in claim 3 in which the probe is formed with a second shoulder;
   a lug extending from the second shoulder to engage a recess in the lip;
   the second shoulder acting to clamp the lip the lug acting to retain the lip in the first recess and to allow the lip to pivot relative to the coupling.

6. A coupling as claimed in claim 1 in which the means located in the second recess is a lug formed on the lip;
   a spring to abut the lug;
   a plug to apply pressure to the lug through the spring.

7. A coupling as claimed in claim 1 in which the body of the coupling is of substantial width, and the gap between adjacent couplings thus relatively small, and in which the second recess has a shoulder at its bottom edge, extending towards the head box when the coupling is in its useful position;
   a corresponding shoulder formed on the lip and adapted to be received within the second recess, whereby when excessive force is applied to the lip the lip bends to touch the coupling at the extremities of the coupling whereby the parts of the lip between the couplings are placed primarily in shear.

8. A coupling as claimed in claim 1 including an adjuster extending towards an actuator whereby movement of the actuator is transmitted to the body, and thus the lip, through the adjuster.

9. A coupling as claimed in claim 8 in which the adjuster includes a force limiter.

10. A coupling as claimed in claim 9 in which the adjuster is formed in two parts, a first part attached to the body and a second part attached to the actuator and in which the force limiter comprises a spring arranged between the first and second parts.

11. A coupling as claimed in claim 10 in which the first part is a first rod with first and second ends with a flange adjacent the first end, with part of the first rod extending beyond the flange and the second part is a second rod with first and second ends with a housing at the first end of the second rod to receive that part of the first rod that extends beyond said flange, and comprising resilient means between the flange and the housing.

12. A coupling as claimed in claim 11 in which the resilient means is a spring.

13. A coupling as claimed in claim 11 in which the first ends of the first and second rods and the flange are protected by a case.

14. A coupling as claimed in claim 10 in which the actuator is housed on a fixed surface above the lip;
   an opening in the fixed surface to receive the second part of the adjuster;
   a flange in the upper end of the second part of the adjuster, above the fixed surface;
   resilient means between the flange and the fixed surface.

15. A coupling as claimed in claim 1 including a position transmitter to signal the position of the lip.

16. A coupling as claimed in claim 15 in which the position transmitter comprises a first flexible vessel to contain a substantially incompressible fluid;
   a sensor attached to the first flexible vessel and attached to a component that moves with the lip;
   a second flexible vessel;
   means tending to compress the second flexible vessel;
   a conduit connected to the first and second flexible vessels whereby movement of the lip moves the sensor to expand or contract the first flexible vessel to move the incompressible fluid through the conduit to expand or contract the second flexible vessel;

means to sense the movement of the second vessel.

17. A coupling as claimed in claim 16 in which the component that moves with the lip is a flange attached to the body of the coupling to contact the sensor for the first flexible vessel.

18. A coupling as claimed in claim 16 in which the means to sense the movement comprises an arm extending from the second vessel to a linear voltage displacement transmitter.

19. A coupling as claimed in claim 16 in which the means tending to compress the second flexible vessel is a spring.

20. A position transmitter to signal the position of a lip on a head box of a paper making machine, the transmitter comprising a first flexible vessel to contain a substantially incompressible fluid;
a sensor attached to the first flexible vessel and attached to the lip;
a second flexible vessel;
means tending to compress the second flexible vessel;
a conduit connected to the first and second flexible vessels whereby movement of the lip moves the sensor to expand or contract the first flexible vessel to move the incompressible fluid through the conduit to expand or contract the second flexible vessel; and
means to sense the movement of the second vessel.

21. A position transmitter as claimed in claim 20 in which the means to sense the movement of the second vessel comprises an arm extending from the second vessel to a linear voltage displacement transmitter.

22. A position transmitter as claimed in claim 20 in which the means tending to compress the second flexible vessel is a spring positioned above the second flexible vessel.

23. A system to attach the lip of a head box on a paper making machine to the head box, the system comprising:
a head box;
a slice lip attached to said head box;
a coupling comprising a body attached to an adjuster extending from an actuator;
means attaching the body to the head box to permit movement of the body relative to the head box, under the influence of the actuator;
means defining a first recess in the body adapted to receive a lip;
means defining a second recess in the body generally perpendicular to the first recess;
means located in the second recess to engage a lip received in the first recess to pivotally clamp the lip against the head box;
a force limiter positioned in the adjuster; and
a position transmitter to signal the position of the lip.

24. A system as claimed in claim 23 in which the adjuster is formed in two parts, the first part attached to the body and a second part attached to the actuator and in which the force limiter comprises a spring arranged between the first and second parts.

25. A system as claimed in claim 24 in which the actuator is housed on a fixed surface above the lip;
an opening in the fixed surface to receive a second part of the adjuster;
a flange in the upper end of the second part of the adjuster, above the fixed surface and in which the force limiter further includes resilient means between the flange and the fixed surface.

26. A system as claimed in claim 23 in which the position transmitter comprises a first flexible vessel to contain a substantially incompressible fluid;
a sensor attached to the first flexible vessel and attached to a component that moves with the lip;
a second flexible vessel;
means tending to compress the second flexible vessel;
a conduit connecting the first and second flexible vessels whereby movement of the lip moves the sensor to expand or contract the first flexible vessel to move the incompressible fluid through the conduit to expand or contract the second flexible vessel; and
means to sense the movement of the second vessel.

* * * * *